United States Patent Office 3,419,055
Patented Dec. 31, 1968

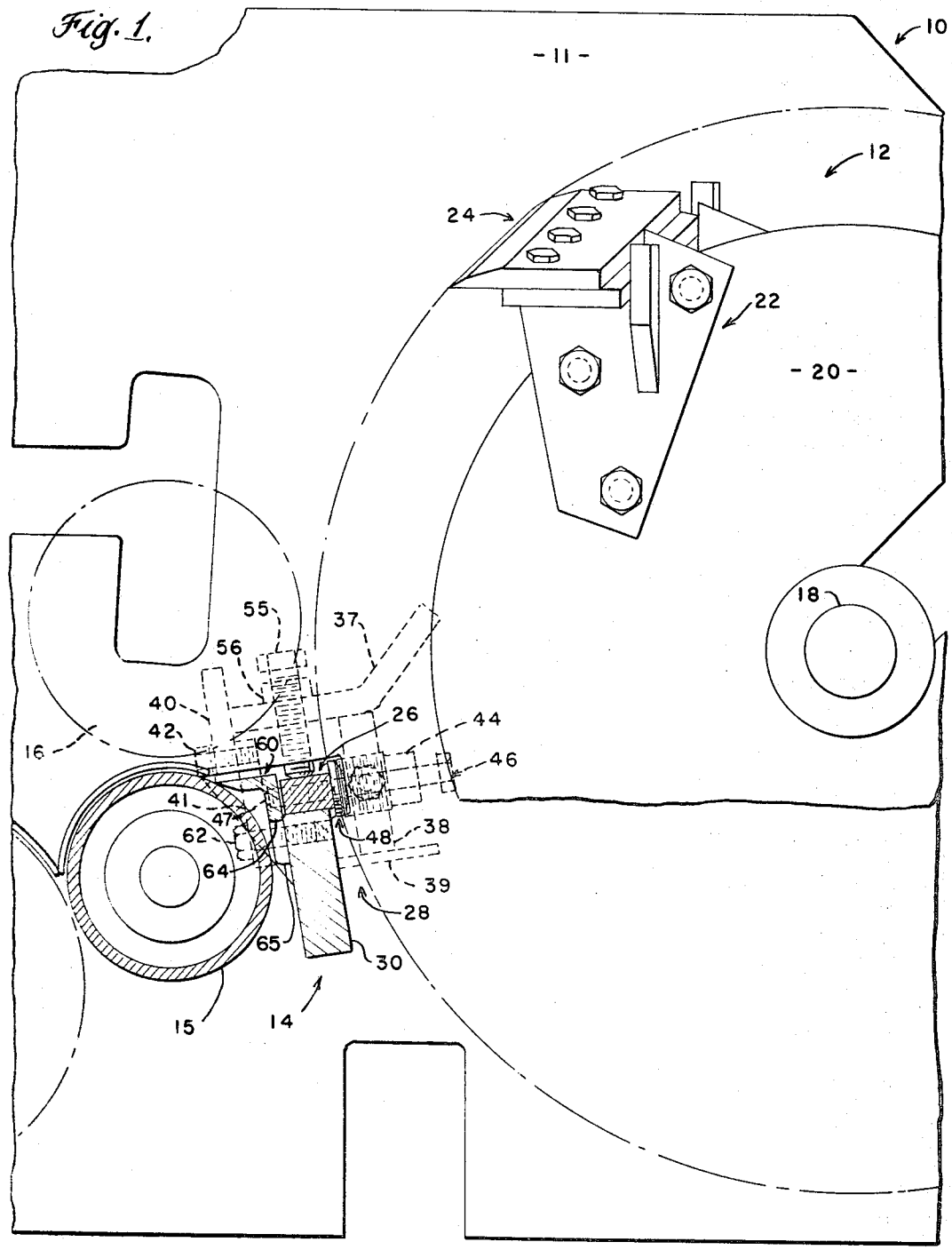

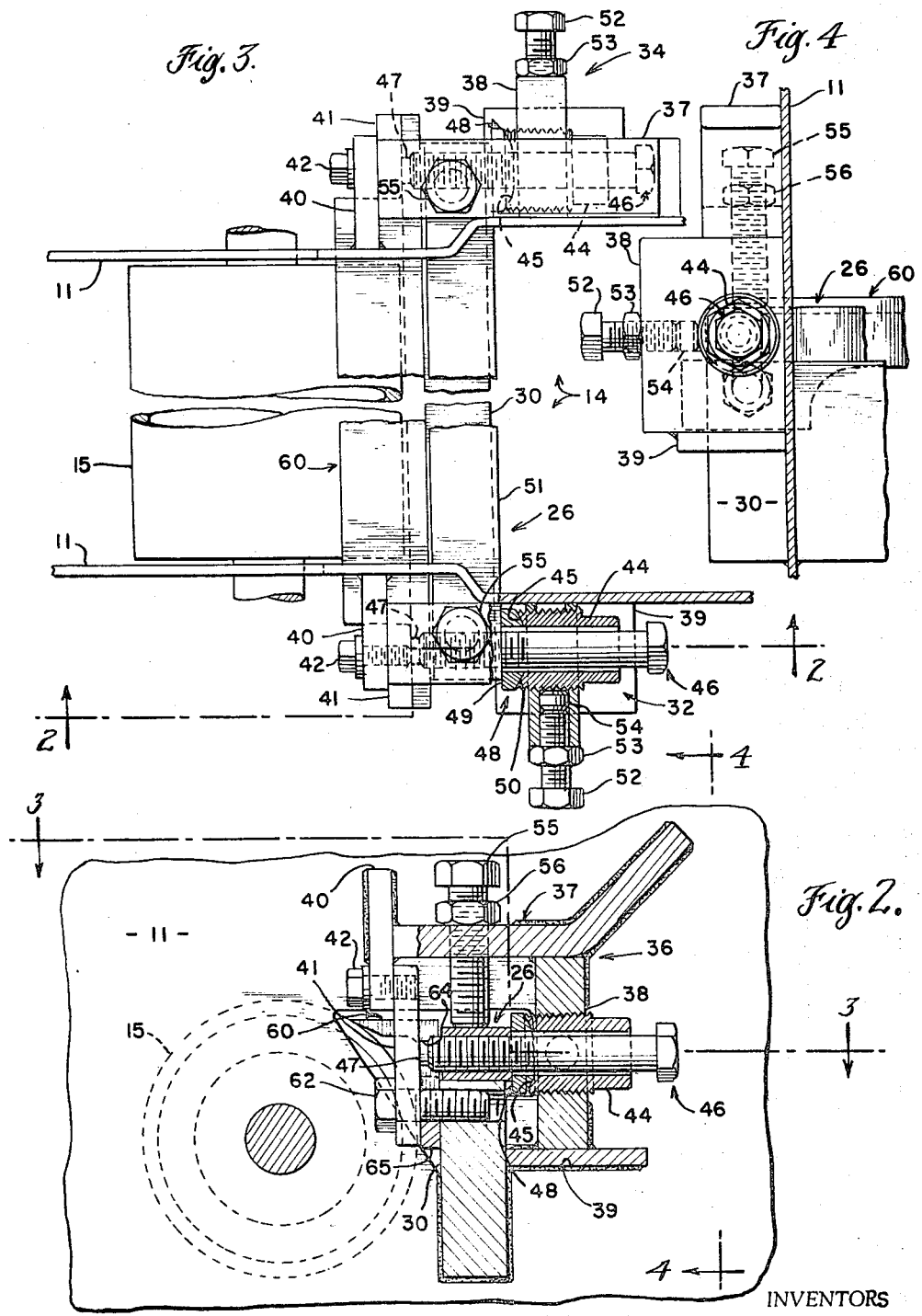

3,419,055
SHEAR BAR MOUNTING
Bruce D. Schwalm, Leola, and Roger L. Risser, Elizabethtown, Pa., assignors to Sperry Rand Corporation, New Holland, Pa., a corporation of Delaware
Filed Sept. 15, 1966, Ser. No. 579,653
7 Claims. (Cl. 146—120)

ABSTRACT OF THE DISCLOSURE

The invention relates to a shear bar adjustment and mounting assembly for use with the rotary cutter and knives on agricultural forage harvesters. The instant device provides an improved shear bar clamping unit having concave-convex universal type of adjustment means for maintaining the clamping forces perpendicular to the shear bar axis and for maintaining correct alignment of the shear bar with respect to its backing and to the rotary cutterhead.

---

This invention relates to agricultural machines for chopping hay or other forage crops into short lengths. More particularly, the invention relates to a shear bar mounting in a forage harvester having a cutterhead of the reel or cylinder type.

A forage harvester, of the type to which this invention is particularly applicable, comprises generally a pickup mechanism, feed rolls which receive material from the pickup and deliver it to be chopped, and a cutter unit which functions to chop the crop material into short lengths and discharge it at a high velocity to a trailing wagon. The chopping or cutting of the crop material is usually effected by means of a rotatably driven cutterhead having one or more blades or knives cooperating with a stationary shear bar. An example of the type of forage harvester referred to is shown in U.S. Patent No. 2,735,469.

It is known to provide a shear bar mounting in a forage harvester with clamping units mounted on the exterior sides of the cutterhead housing side walls for adjustably holding the shear bar in a given position on a shear bar backing member. The exteriorly mounted clamping units provide a convenient and readily accessible means for removal and installation of the shear bar and for adjustment of the shear bar to the proper operating position.

One of the main problems in the described type of shear bar mounting is that of maintaining the clamping units in line with respect to the shear bar and with respect to each other. If the clamping units become slightly out of line, the straightness of the shear bar is affected and stresses are introduced into the mounting components which often result in fatigue failure of these components. Thus, close tolerances must be maintained in the manufacturing of the shear bar mountings which makes them relatively expensive. Further, it is necessary for the operator to precisely adjust the mountings during operation and to guard against any slight changes in the relative positions of the parts due to wear or other causes.

An object of the present invention is to provide, in a forage harvester of the character described, an improved shear bar mounting which has an increased wear life and attains a high operating efficiency.

More specifically stated, it is an object of this invention to provide a shear bar mounting with aligning means which automatically compensate for misaligned mounting components and thereby eliminate fatigue failures of the components.

Another object of this invention is to provide a shear bar mounting in which the shear bar can be easily and quickly adjusted relative to the cutterhead and in which the shear bar is rigidly and immovably held in an adjusted position.

A further object of this invention is to provide a shear bar mounting of the character described which has relatively simple parts, can be easily assembled, and manufactured at low cost.

Other objects of this invention will be apparent hereinafter from the specification and from the recital in the appended claims.

In the drawings:
FIG. 1 is a sectional view with the shear bar, shear bar backing member, scraper, and rolls shown in section;
FIG. 2 is a section taken on the line 2—2 of FIG. 3;
FIG. 3 is a plan view of FIG. 2 with the center section broken out and showing one of the clamping units in section, as taken on line 3—3 of FIG. 2; and
FIG. 4 is a section taken on the line 4—4 of FIG. 2.

Referring now to the drawings by numerals of reference and particularly to FIG. 1, 10 denotes generally a forage harvester cutter unit comprising a pair of vertically extending housing side walls 11, a cutterhead 12, and a shear bar assembly 14. A lower feed roll 15 and an upper feed roll 16, shown diagrammatically in FIG. 1, serve to feed crop material into the path of cutterhead 12.

Cutterhead 12 comprises a shaft 18 which is suitably journalled in side walls 11, axially spaced discs 20 on shaft 18 which support a plurality of knife mounting fixtures 22, and a knife 24 on each of the fixtures 22. In the drawings, only one knife is shown. It is understood, however, that there are three or more knives circumferentially spaced around the cutter to succesisvely cooperate with a stationary shear bar 26, hereinafter described.

Shear bar assembly 14 comprises shear bar 26 and shear bar support 28. Shear bar support 28 includes a backing member 30 which extends between and through side walls 11—11 and is welded thereto, and clamping units 32 and 34 on opposite ends of backing member 30. Each of the clamping units 32 and 34 is comprised of the same structural elements, and the clamping units are identical, except for the arrangement of the structural elements to conform to left-side and right-side mountings, as shown in FIG. 3. Thus, only clamping unit 32 will be described.

Clamping unit 32 (see FIG. 2) comprises a bracket 36 which extends around shear bar 26 and is welded to side wall 11. Bracket 36 is formed from an angularly shaped first leg 37, a generally vertically extending second leg 38, a bottom element 39 which abuts against backing member 30, an element 40 mounted at one end of angular leg 37, and a plate 41 fixed to member 40 by fastener 42. A sleeve 44 having a concave end face 45 is threaded into leg 38. A bolt 46 extends through sleeve 44, is threaded through shear bar 26, and has a cylindrical end portion 47 which abuts against plate 41. A washer 48 having a flat face 49 and a convex face 50 is interposed between sleeve 44 and side 51 of shear bar 26 (see FIG. 3). A threaded screw 52 having a lock nut 53 bears against a plastic element 54 to hold sleeve 44 in an adjusted position. A lock screw 55 having a lock nut 56 is threadedly received in leg 37 and prevents upward movement of shear bar 26 relative to backing member 30.

An important feature of this invention is the alignment means in clamping unit 32 which serves to automatically compensate for misaligned mounting components. Shear bar 26 is held in clamping unit 32 by a stop means consisting of sleeve 44 and washer 48 and a biasing means provided by the action of bolt 46 against plate 41. The interaction of convex face 50 on washer 48 and concave face 45 on sleeve 44 provides the alignment means. As shown in FIG. 3, clamping unit 32 is perpendicular to shear bar 26 in its normal position. If side wall 11 should become slightly out of line, unit 32 will be shifted from the perpendicular position. When clamping unit 32 is forced out of line, however, washer 48 will move sufficiently in the socket formed by face 45 of sleeve 44 so that face 49 of washer 48 will remain in planar contact with side 51 of shear bar 26. Thus, no bending loads are imposed on the shear bar by the misaligned clamping unit.

A scraper 60 is adjustably mounted on backing member 30 by fasteners 62 which pass through face plate 41 and are threadably received in member 30. Slots 64 are provided in a vertically extending leg 65 of scraper 60 and provide for vertical adjustment of the scraper to regulate the clearance between scraper 60 and smooth feed roll 15.

When it is desired to adjust shear bar 26 relative to cutterhead knives 24, lock screws 52 and 55 are loosened, and sleeve 44 and bolt 26 are rotated in the necessary directions to obtain the proper clearance. It is, of course, necessary to adjust both clamping units. Since a clearance of between .010 and .015 is maintained between the shear bar and the cutterhead knives, the adjustment is a relatively critical operation. It will be apparent from the foregoing discussion, that should one of the clamping units have become slightly out of line with respect to the other clamping unit, or with respect to the shear bar, the shear bar can still be adjusted to the proper operating position because of the aligning means in the clamping units. Thus, parts which have become slightly misaligned from wear or other causes do not affect the straightness of the shear bar, and residual stresses which could result in fatigue failures are not setup in the mounting components.

While this invention has been described in connection with a particular embodiment thereof, it will be understand that it is capable of modification, and this application is intended to coved any variations, uses or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A shear bar assembly comprising in combination a shear bar support, an elongated shear bar on said support, said shear bar support comprising an elongated backing member and a pair of clamping units spaced at opposite ends of said backing member, each of said clamping units comprising stop means and biasing means, said biasing means serving to force a side of said shear bar against a surface of said stop means to hold the shear bar in a given position relative to said backing member, and said stop means comprising aligning means for maintaining said surface in substantially planar contact with said shear bar side.

2. A shear bar assembly, as recited in claim 1, wherein each of said clamping units comprises a bracket member having a first leg generally perpendicular to said backing member and a second leg generally parallel to said backing member, said stop means and biasing means pass through said second leg, and a lock screw is threaded through said first leg and against said shear bar.

3. A shear bar assembly, as recited in claim 1, wherein said biasing means comprises a bolt having a shank portion which passes through said stop means and a second portion threaded through said shear bar, said bolt has an end on said second portion which abuts against a plate in said bracket in line with and spaced from said stop means, and when said bolt is turned in a direction to advance it through the shear bar said shear bar will be moved away from said plate and toward said stop means.

4. A shear bar assembly, as recited in claim 1, wherein said stop means comprises a sleeve threaded into a bracket in said clamping unit, said sleeve has a concave face at one end, and said aligning means comprises a washer having a convex face which abuts the concave face of said sleeve, and said surface in contact with said shear bar is on said washer opposite said convex face.

5. A shear bar assembly comprising in combination a backing member, an elongated shear bar on said backing member having a longitudinal axis, clamping means on said backing member for exerting a clamping force on said shear bar to hold said shear bar in a given position relative to said backing member, and said clamping means comprising aligning means having universal type coacting means to maintain said clamping force substantially perpendicular to said shear bar axis.

6. A chopper for hay or other forage crops comprising a housing having a pair of spaced apart vertically extending side walls, a cutterhead journalled in said side walls for rotation about an axis perpendicular to said side walls, said cutterhead having at least one axially extending knife which generates a cylinder on rotation, a backing member extending through said side walls and fixed to each of said side walls, a shear bar on said backing member having a longitudinal axis parallel to said axis of rotation and having a side adjacent said cylinder of rotation, a clamping unit fixed to each of said side walls for exerting a clamping force on said shear bar to hold said shear bar on said backing member in a given adjusted position, and each of said clamping units comprising aligning means so that said clamping force remains substantially perpendicular to said longitudinal axis regardless of the position of said side walls.

7. A chopper, as recited in claim 6, wherein each of said clamping units comprises a bracket member having a first leg generally perpendicular to said backing member and a second leg generally parallel to said backing member, stop means and means for biasing said shear bar against said stop means pass through said second leg, and said stop means comprises said aligning means.

References Cited

UNITED STATES PATENTS

| 1,404,518 | 1/1922 | Frick | 146—120 |
| 3,196,724 | 7/1965 | Frank | 83—674 X |
| 3,340,757 | 9/1967 | Rudszinat | 83—674 X |
| 3,342,231 | 9/1967 | Waldrop | 146—120 |

W. GRAYDON ABERCROMBIE, *Primary Examiner.*

U.S. Cl. X.R.

146—107; 83—674, 700